H. E. COFFIN.
EXPLOSION ENGINE.
APPLICATION FILED APR. 27, 1911.
1,153,675.
Patented Sept. 14, 1915.
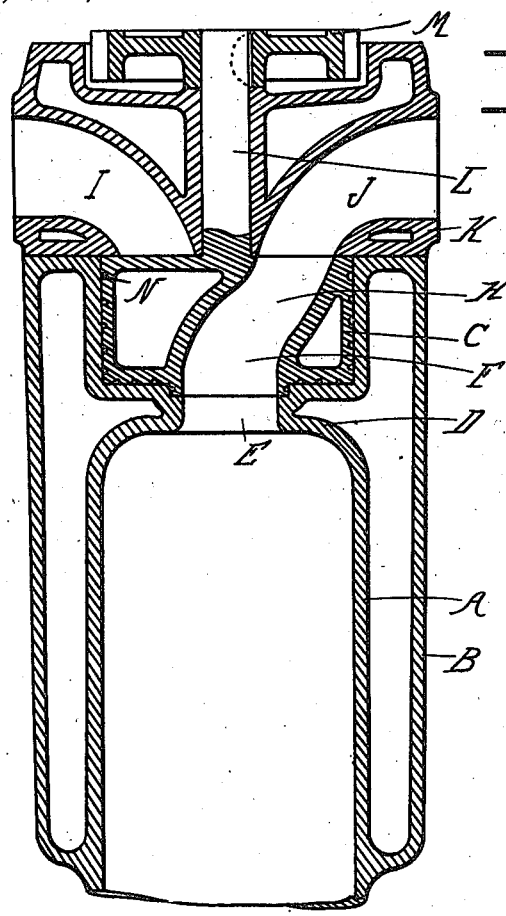
Fig. 1.
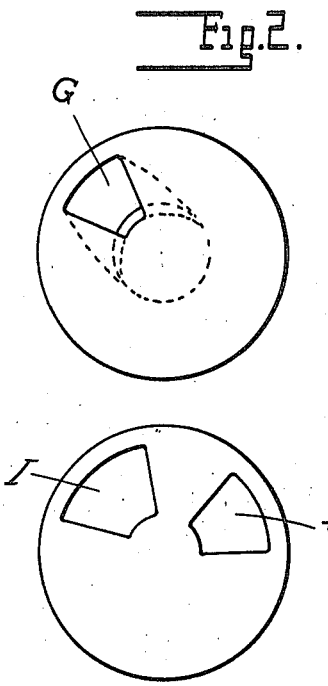
Fig. 2.
Fig. 3.
Witnesses
W. K. Ford
James P. Barry
Inventor
Howard E. Coffin
By Whittemore Hulbert & Whittemore
Attys

UNITED STATES PATENT OFFICE.

HOWARD E. COFFIN, OF DETROIT, MICHIGAN.

EXPLOSION-ENGINE.

1,153,675.  Specification of Letters Patent.  Patented Sept. 14, 1915.

Application filed April 27, 1911.  Serial No. 623,676.

*To all whom it may concern:*

Be it known that I, HOWARD E. COFFIN, a citizen of the United States of America, residing at Detroit, in the county of Wayne and State of Michigan, have invented certain new and useful Improvements in Explosion-Engines, of which the following is a specification, reference being had therein to the accompanying drawings.

The invention relates to explosion engines and has more particular reference to that type of construction in which a rotary valve is employed.

It is an object of the invention to obtain a construction of valve which is effectually protected from the heat of the explosion chamber and is also in balance so as to be relieved from the explosive pressure during the explosion stroke.

With these objects in view the invention consists in the construction as hereinafter set forth.

In the drawings, Figure 1 is a longitudinal section through a cylinder and valve of the engine; Fig. 2 is a plan view of the valve; and Fig. 3 is a diagrammatic view of the ported head or valve seat.

In the employment of rotary valves for explosion engines serious difficulties are encountered not present where such valves are used in steam engine constructions. Thus during the explosion of the gases the pressure rises to several times the maximum developed in a steam engine, and if the valve is not balanced a considerable resistance is afforded to its movement. To overcome this difficulty I have devised a construction in which a balanced valve is used and is arranged in connection with the engine cylinder as follows: A is the cylinder provided with a suitable water jacket B, C is a rotary valve arranged with its axis coincident with that of the cylinder but separated from the cylinder by a head D. E is a port in the head D concentric with the axis and in constant communication with a corresponding port F in the valve. The opposite face of the valve has an eccentric port G therein connected by an oblique passage H with the port F and adapted to be successively registered with inlet and exhaust ports I and J in a detachable head K for the cylinder. The water jacket B preferably extends to surround the head D and also the recess in which the valve C is located, while the detachable head K is chambered to form a water jacket for the valve seat and inlet and exhaust passages. Thus it will be observed that the valve has its entire external surface in contact with cooled bearings which will prevent the carbonizing of the lubricating oil. It will be further observed that the pressure developed in the explosion chamber does not re-act upon the valve to resist its movement for the reason that the port E is at no time covered by any portion of the valve, and the closure of the port G is effected by the stationary head K. The area of these ports G and E being substantially equal the valve will be practically balanced.

For operating the valve a rotary stem L passes out axially through the head K, and a gear M secured to said stem is employed for rotating the same through the medium of any suitable drive connection (not shown). The bearing surfaces of the valve may be lubricated by any suitable construction of lubricating means but to maintain a seal and to properly distribute the lubricant channels N are preferably arranged in the surface of the valve or its seat.

What I claim as my invention is:

1. In an explosion engine, the combination with the cylinder of a cylindrical rotary valve arranged external to said cylinder and having a substantially longitudinally-extending passage-way therethrough with an axially arranged port in constant communication with said cylinder, and a valve seat for the opposite side of the valve for receiving the pressure of explosion in said cylinder.

2. In an explosion engine, the combination with the cylinder, of a rotary valve having parallel faces, said valve having a port therethrough concentric to its axis on the face adjacent to said cylinder and eccentric on the opposite face, a head interposed between said valve and cylinder having a port in constant communication with the concentric port in said valve, and a valve seat for the opposite face of said valve having a plurality of ports with which said eccentric port is successively registered.

3. In an explosion engine, the combination with the cylinder, of a cylindrical rotary valve having a port concentric with the axis on the side adjacent to said cylinder and eccentric on the opposite side, a head interposed between said cylinder and valve having a port in constant registration with said concentric port, a water jacket surrounding said cylinder and valve and extending into said head, and a valve seat for the opposite face of said valve having a plurality of ports with which said eccentric port in said valve is successively registered.

4. In an explosion engine, the combination with the cylinder, of a cylindrical rotary valve having a port concentric with the axis on the side adjacent to said cylinder, and eccentric on the opposite side, a head interposed between said valve and cylinder having a port in constant registration with said axial port in said valve, and a detachable head for said cylinder forming a valve seat having a plurality of ports for successive registration with the eccentric port in said valve.

5. In an explosion engine, the combination with the cylinder, of a cylindrical rotary valve in axial alinement therewith and having a port concentric with the axis on the side adjacent to said cylinder and eccentric on the opposite side, a detachable head for the cylinder forming a valve seat having a plurality of ports therein with which said eccentric port in the valve is successively registered, and a pressure receiving head between said valve and cylinder for shielding the latter from the pressure in the explosion chamber.

6. In an explosion engine, the combination with the cylinder, of a cylindrical rotary valve said valve being balanced and having a port concentric with the axis on the side adjacent to said cylinder and eccentric in another portion of the valve, a head interposed between said cylinder and valve having a port in constant registration with said concentric port, a water jacket surrounding said cylinder and valve and extending into said head, and a valve seat for the eccentric ported portion of said valve having a plurality of ports with which said eccentric port is successively registered.

7. In an explosion engine, the combination with the cylinder, of a rotary valve having parallel faces and provided with a passage way therethrough opening through opposite faces of the valve, the opening in one face being in constant communication with the cylinder, and the opening in the opposite face having the axis thereof to one side of the axis of the first-mentioned opening, the pressure on said opposite valve faces being equal and a ported seat for the second-mentioned valve face adapted to receive the pressure of explosion.

8. In an explosion engine, the combination with the cylinder having a seat provided with a concentric port in constant communication with said cylinder, of a rotary valve having a concentric opening in one face thereof alining with said concentric port and having the remaining portion of said face engaging said seat and shielded thereby from the pressure of explosion, an opening in the opposite face of said valve eccentric to and of substantially the same size as said first-mentioned opening, said openings being connected by a passage extending through the valve, and a ported seat for said second mentioned valve face for receiving the pressure of explosion, the areas of the seats for the opposite valve faces being substantially equal.

9. In an explosion engine, the combination with a cylinder, of a cylindrical rotary valve arranged external to said cylinder, ported seats for said valve of substantially equal area, said valve having a passageway therethrough, the opening at one end being in constant communication with the port in one of said valve seats and the opening at the other end of the passageway having its axis to one side of the axis of the first-mentioned opening, the amount of surface exposed for upward and downward pressure in said passageway being substantially equal.

10. In combination, an engine cylinder having a central port in its head, a casing secured to the cylinder and having inlet and exhaust ports eccentric to the port in the head of the cylinder and a valve having separated plates one of which is provided with an aperture concentric with the port in the head of the cylinder and the other plate having an aperture eccentric thereto, said apertures arranged to cause communication between the cylinder port and the inlet and exhaust ports whereby the inlet and exhaust gases travel the same path.

11. In combination, an engine cylinder having a central port in its head, a casing secured to the cylinder and having inlet and exhaust ports and a valve comprising separated plates, one of said plates having an aperture concentric with the axis of rotation of said plates and adapted to register with the aperture in the head, the other plate having an aperture eccentric to the axis of rotation of said plates and adapted to register with the inlet and exhaust ports, together with means to cause simultaneous rotation of the plates.

In testimony whereof I affix my signature in presence of two witnesses.

HOWARD E. COFFIN.

Witnesses:
JAMES P. BARRY,
W. K. FORD.